(12) United States Patent
Allan et al.

(10) Patent No.: US 8,553,568 B2
(45) Date of Patent: Oct. 8, 2013

(54) INTERNETWORKING FRAMEWORK FOR MULTI-PROTOCOL LABEL SWITCHING-TRANSPORT PROFILE AND OPERATION ADMINISTRATION AND MAINTENANCE PROTOCOLS

(75) Inventors: David Ian Allan, San Jose, CA (US); David Saccon, San Francisco, CA (US); David Sinicrope, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 372 days.

(21) Appl. No.: 13/076,189

(22) Filed: Mar. 30, 2011

(65) Prior Publication Data
US 2012/0163189 A1 Jun. 28, 2012

Related U.S. Application Data

(60) Provisional application No. 61/427,447, filed on Dec. 27, 2010.

(51) Int. Cl.
*H04J 1/16* (2006.01)
(52) U.S. Cl.
USPC .................... 370/244; 370/241; 370/242
(58) Field of Classification Search
USPC ........................ 370/241–242, 244
See application file for complete search history.

(56) References Cited

U.S. PATENT DOCUMENTS

| | | | | |
|---|---|---|---|---|
| 5,553,057 A * | 9/1996 | Nakayama | ................. | 370/241 |
| 2008/0253295 A1* | 10/2008 | Yumoto et al. | ............... | 370/245 |
| 2008/0285466 A1 | 11/2008 | Salam et al. | | |
| 2009/0161562 A1* | 6/2009 | Shah et al. | .................... | 370/245 |
| 2009/0168783 A1* | 7/2009 | Mohan et al. | .............. | 370/395.5 |
| 2010/0049868 A1* | 2/2010 | Ginsberg et al. | ............. | 709/242 |
| 2010/0189127 A1* | 7/2010 | Suzuki | ......................... | 370/465 |
| 2011/0141911 A1* | 6/2011 | Washam et al. | ............ | 370/241.1 |
| 2012/0163190 A1* | 6/2012 | Jocha et al. | ................ | 370/241.1 |

OTHER PUBLICATIONS

D. Katz et al., "Bidirectional Forwarding Detection (BFD)," Jun. 2010, 49 pages, Internet Engineering Task Force (IETF), Request for Comments: 5880, IETF Trust.
ITU-T Recommendation Y.1712, Telecommunication Standardization Sector of ITU, Series Y: Global Information Infrastructure, Internet Protocol Aspects and Next Generation Networks, Internet protocol aspects—Operation, administration and maintenance, OAM functionality for ATM-MPLS interworking, Jan. 2004, 28 pages, International Telecommunication Union.
ITU-T Recommendation Y.1731, Telecommunication Standardization Sector of ITU, Series Y: Global Information Infrastructure, Internet Protocol Aspects and Next-Generation Networks, Internet protocol aspects—Operation, administration and maintenance, OAM functions and mechanisms for Ethernet based networks, May 2006, 80 pages, International Telecommunication Union.
David Allan, "Draft Recommendation Y.gina (Generic interworking architecture)," International Telecommunication Union, Study Group 13, Telecommunication Standardization Sector, TD 26 (WP 3/13), Study Period 2005-2008, Apr. 25-May 6, 2005, 19 pages.

* cited by examiner

*Primary Examiner* — Hassan Kizou
*Assistant Examiner* — Ashil Farahmand
(74) *Attorney, Agent, or Firm* — Blakely Sokoloff Taylor & Zafman, LLP

(57) ABSTRACT

Systems, methods, and apparatuses for BFD to Y.1731 internetworking are described. In one embodiment, a method of processing defect conditions in a maintenance endpoint (MEP) of a first domain, the MEP a component of a bidirectional forwarding detection (BFD) to Y.1731 interworking interface (IWF) in a multi-protocol label switching (MPLS) network is described.

7 Claims, 9 Drawing Sheets

INTERNETWORKING FRAMEWORK FOR MULTI-PROTOCOL LABEL SWITCHING-TRANSPORT PROFILE AND OPERATION ADMINISTRATION AND MAINTENANCE PROTOCOLS

PRIORITY

This application claims the benefit of U.S. Provisional Application No. 61/427,447, entitled, "interworking Framework For Multi-Protocol Label Switching-Transport Profile And operation Administration And Maintenance Protocols", filed on Dec. 27, 2010.

BACKGROUND

OAM (Operation, Administration, and Maintenance) describes the instrumentation of telecommunication networks that provide operators with the tools to remotely manage their network infrastructure. At the device level, OAM protocols generate messages that are used by operations staff to help identify problems in the network. For example, OAM allows automatic network monitoring, so that the operator receives notification of equipment outages. In the event of a fault, the information generated by OAM helps the operator troubleshoot the network to locate the fault, identify which services have been impacted and take the appropriate action.

Both the Y.1731 protocol (ITU-T Recommendation Y.1731) based OAM and IETF RFC 5880 BFD based OAM is well understood. Further previous OAM interworking efforts have outlined general principles for OAM interworking that can be applied to the interworking of Y.1731 based fault management and BFD. These are documented in a specific case of Y.1711 to ATM I.610 interworking in ITU-T Recommendation Y.1712, and in the unpublished draft ITU-T Recommendation Y.Gina (Generic interworking document).

However, the existence of significant deployments of MPLS based upon proprietary Y.1731 OAM poses the problem of rationalizing these deployments with that of IETF standardized MPLS. The present invention provides an approach to interworking the two to produce a harmonized network.

SUMMARY

Some embodiments of a method of processing defect conditions in a maintenance endpoint (MEP) of a first domain, the MEP a component of a bidirectional forwarding detection (BFD) to Y.1731 interworking interface (IWF) in a multi-protocol label switching (MPLS) network are described. In one embodiment, the method comprises: receiving a peer alarm indication signal (AIS) at an IWF MEP of a first domain of the MPLS network from an IWF MEP in the second domain of the MPLS; and in response to receiving the peer AIS from the MEP of the second domain of the MPLS network, the MEP of the first domain of the MPLS network halting generation of external signals, generating an AIS indication in a format appropriate for the first domain, and providing the AIS indication to another MEP in the first domain of the MPLS network.

Some embodiments of a system for processing defect conditions in a maintenance endpoint (MEP) of a first domain, the MEP a component of a bidirectional forwarding detection (BFD) to Y.1731 interworking interface (IWF) in a multi-protocol label switching (MPLS) network are described. In one embodiment, the system comprises: a BFD IWF MEP for receiving and transmitting messages and indications from a Y.1731 IWF MEP in a Y.1731 domain, wherein the BFD IWF MEP to operate according to a state machine, wherein in the init state a remote MEP in the BFD domain is communicating with the BFD IWF MEP, and the BFD IWF MEP wants to create a session with remote MEP, but the remote system does not yet realize this, an up state a BFD session has successfully been established between the remote MEP in the BFD domain and the BFD IWF MEP, a down state wherein a BFD session between the remote MEP in the BFD domain and the BFD IWF MEP is down and a forwarding path from the BFD IWF MEP is unavailable, and a down/off state the BFD IWF MEP halts generation of external signals, generates an alarm indication signal (AIS) in a format appropriate for the BFD domain, and provides the AIS to another MEP in the BFD domain of the MPLS network; and the Y.1731 IWF MEP, the Y.1731 IWF MEP to operate according to a state machine, wherein in the up state the Y.1731 IWF MEP generates continuity check messages, and down state halts the generation of continuity check messages and generates AIS in a format appropriate for the Y.1731 domain.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
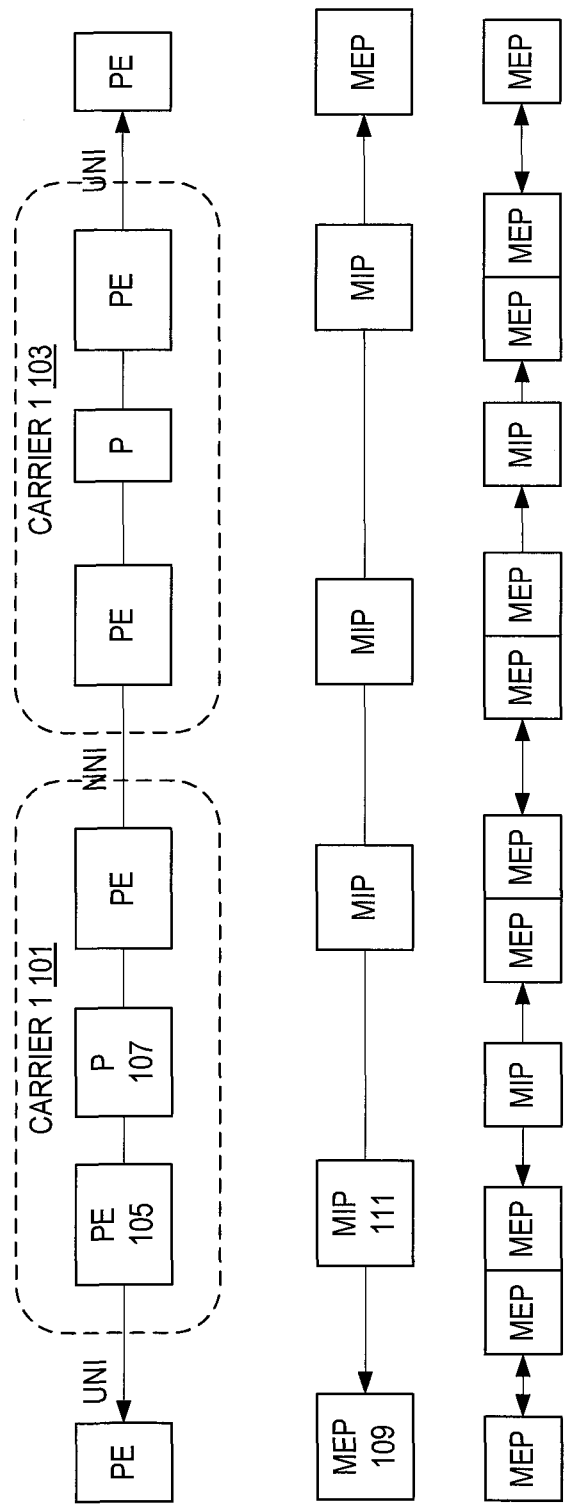
FIG. 1 illustrates an exemplary MPLS-TP network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Operation, Administration, and Maintenance (OAM) describes processes, activities, tools, standards, etc., involved with operating, administering, and maintaining computer networks. OAM is implemented for many different types of computer networks, such Ethernet, Internet Protocol (IP), multi-protocol label switching (MPLS), asynchronous transfer mode (ATM), virtual private LAN service (VPLS), etc. Each type of network will have different data plane OAM mechanisms tailored to the information transfer characteristics and specific modes of failure inherent to the network type. For example, in an Ethernet network, 802.1ag Connectivity Fault Management (CFM) is used as an OAM management tool, and in a MPLS/VPLS network Virtual Circuit Connectivity Verification (VCCV) is an applicable OAM tool. OAM tools are used, in part, to detect network connectivity faults, herein referred to as faults. An example of a fault is\when a link in the network is cut. Furthermore, a fault state can change for example when a severed link is repaired.

Figure 2:
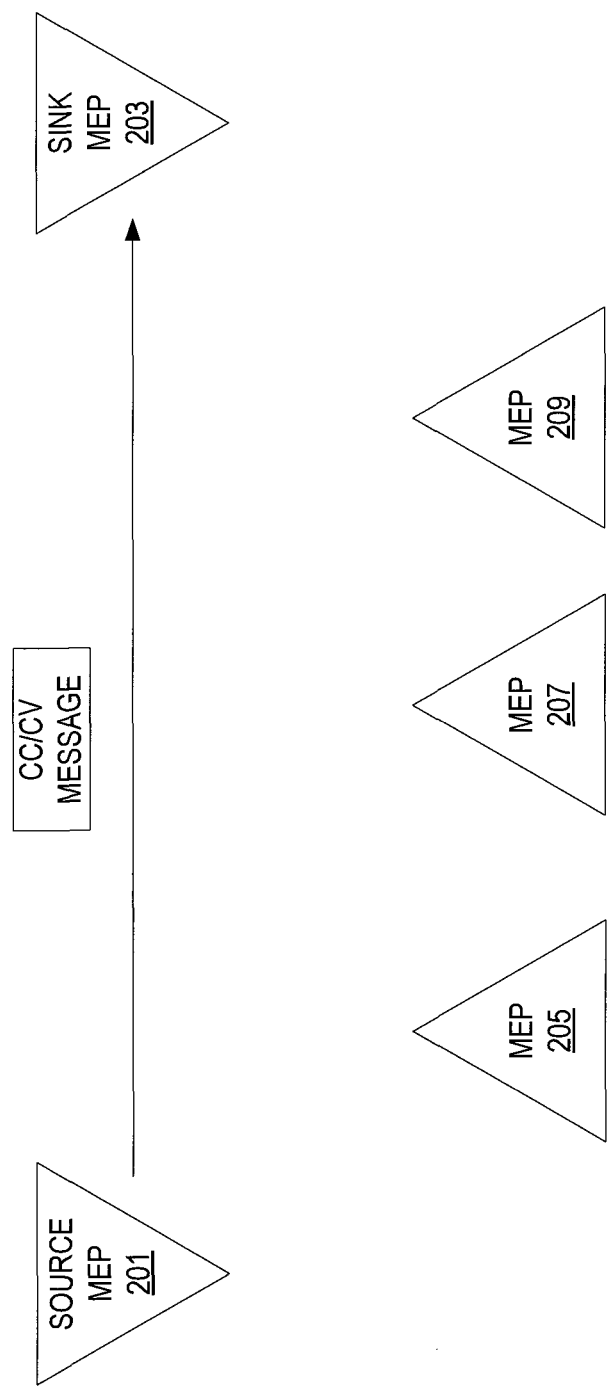
FIG. 2 illustrates an example of OAM processing in a network such as MPLS.

FIG. 1 illustrates an exemplary MPLS-TP network. In this example, there are two carriers (domains) 101 and 103. Each carrier has provider edge routers 105 and one or more provider routers 107. Below the carrier level is end-to-end OAM through Management Endpoints (MEPs) 109 and provider edges outside of the carrier (sometimes called consumer equipment). MEPs are often illustrated as triangles. Also in the end-to-end level are Maintenance Intermediate Points (MIPs) 111 which reside on nodes that a path transits between MEPs. Per carrier OAM is shown in the final level. In this level there are ingress and egress MEPs per PE of each carrier and MIPs per provider router. FIG. 2 illustrates an example of OAM processing in a network such as MPLS.

In the example of FIG. 2, a CC/CV message is sent from a source MEP 201 to a sink MEP 203 via the connectivity structure of interest, typically an LSP. These types of messages act as "I'm here" messages that let the sink MEP 203 know that the source MEP 201 is up and that the connection between the two entities is intact. The figure also illustrates several intermediate MEPs 205-209 that exist along the path between the source 201 and sink 203 MEPs. A CC/CV message from the source MEP 201 flows through these intermediate MEPs 205-209 although the connections are not shown here so as to not obscure the overall concept. During typical operation, these types of messages are sent at periodic intervals and the failure to receive a message for a specified interval is considered to be a failure.

As noted earlier, there are several different OAM protocols. One such protocol is Bi-Directional Forwarding Detection (BFD). As detailed in RFC 5880, BFD is designed to detect failures in communication with a forwarding plane next hop. It is intended to be implemented in some component of the forwarding engine of a system in cases where the forwarding and control engines are separated. This not only binds the protocol more to the forwarding plane, but decouples the protocol from the fate of the routing protocol engine, making it useful in concert with various "graceful restart" mechanisms for those protocols. BFD may also be implemented in the control engine, though doing so may preclude the detection of some kinds of failures.

BFD operates on top of any data protocol (network layer, link layer, tunnels, etc.) being forwarded between two systems. It is currently always run in a unicast, point-to-point mode. BFD packets are carried as the payload of whatever encapsulating protocol is appropriate for the medium and network. BFD may be running concurrently at multiple layers in a system. The context of the operation of any particular BFD session is bound to its encapsulation.

BFD can provide failure detection on any kind of path between systems, including direct physical links, virtual circuits, tunnels, MPLS Label Switched Paths (LSPs), multihop routed paths, and unidirectional links (so long as there is some return path, of course). Multiple BFD sessions can be established between the same pair of systems when multiple paths between them are present in at least one direction, even if a lesser number of paths are available in the other direction (multiple parallel unidirectional links or MPLS LSPs, for example).

BFD is a simple Hello protocol that, in many respects, is similar to the detection components of other well-known routing protocols. A pair of systems can be configured to transmit BFD packets periodically over each path between the two systems, and if a system stops receiving BFD packets for long enough, some component in that particular bidirectional path to the neighboring system is assumed to have failed. Under some conditions, systems may then negotiate not to send periodic BFD packets or diminish the rate of sending BFD packets in order to reduce overhead.

In MPLS-TP, BFD runs in asynchronous mode. In this mode, BFD Control packets, the "Hello" messages, are periodically sent at configurable time rate and in some embodiments are employed as MPLS-TP CV/CC message. This rate is typically a fixed value for the lifetime of the session. There are two modes of operation for bi-directional LSPs. One in which the session state of both directions of the LSP is coordinated and one constructed from BFD sessions in such a way that the two directions session state can operate independently. A single bi-directional BFD session is used for coordinated operation. Two separate BFD sessions are used for independent operation.

Coordinated operation is what was specified for normal BFD operation is as described in RFC 5880 (although it is not named as such in that memo) and is not particularly relevant for the following discussion. Independent operation ("independent mode" specified in draft-cc-cv-rdi) is characterized by the setting of MinRxInterval to zero by the MEP that is typically the session originator (referred to as the source MEP), and there will be a session originator at either end of the bi-directional LSP. Each source MEP will have a corresponding sink MEP that has been configured to a Tx interval of zero.

Another OAM protocol is Y.1731. The Y.1731 OAM protocol and numerous derivatives exist in industry including those applied to Ethernet and proprietary versions of MPLS. Detailed below, are embodiments of state machines and MEPs used to internetwork BFD with Y.1731.

Figure 3:
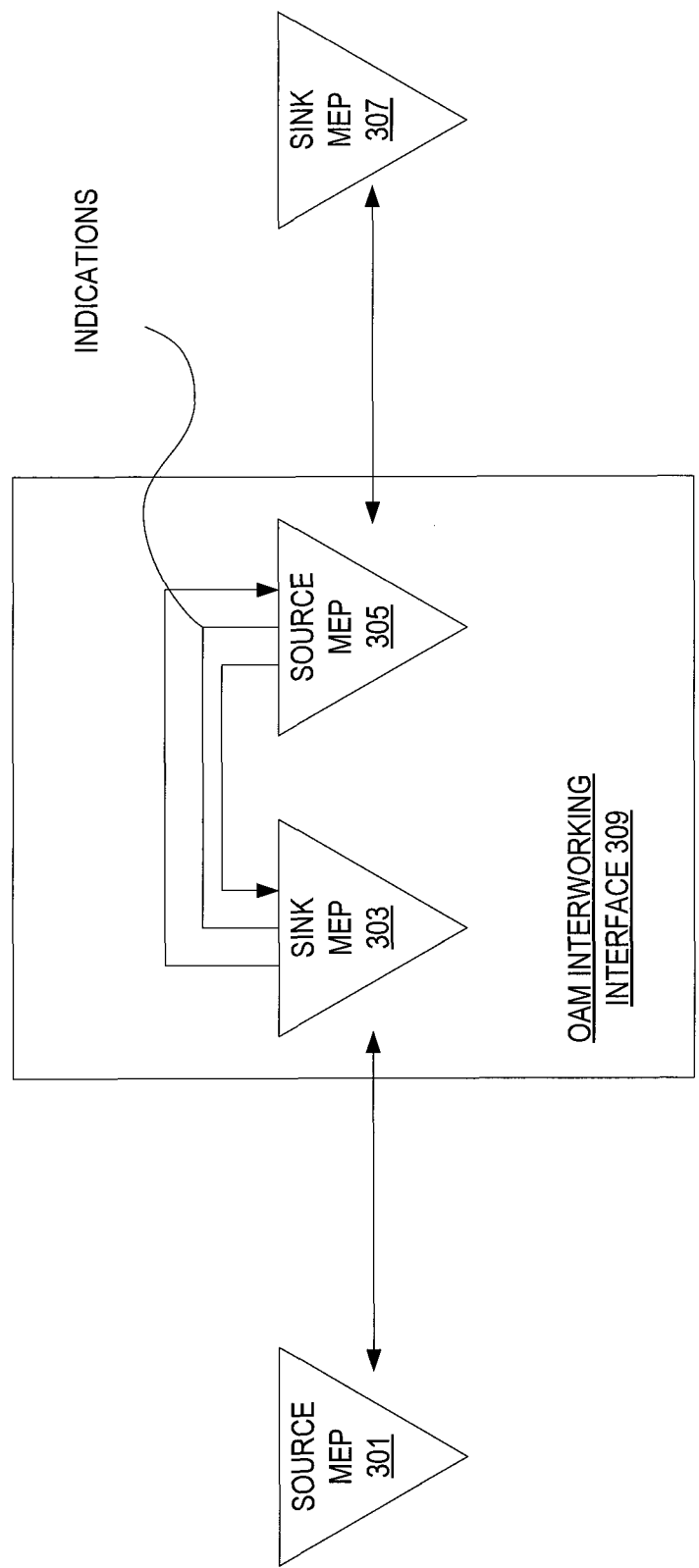
FIG. 3 illustrates an exemplary OAM interworking interface ("IWF") 309 between two disparate domains 311 and 313 (one being BFD and the other Y.1731).

In the embodiments detailed below, internetworking is achieved, at least in part, by having state machines, in peer MEPs at the interface between BFD and Y.1731 communicate specific OAM indications between the interworking MEPs. These state machines may be implemented as instructions stored in memory. FIG. 3 illustrates an exemplary OAM interworking interface ("IWF") 309 between two disparate domains 311 and 313 (one being BFD and the other Y.1731). The normal client/server behavior is that a server layer IWF Sink MEP 303 communicates OAM indications to the server layer adaptation function. This function then translations these OAM indications into client layer indications such as Alarm Indication Signal ("AIS").

A MEP, upon detecting a signal fail condition, can instruct the server layer adaptation function to transmit AIS packets in all affected clients in a direction opposite to its peer MEP to notify its client layer MEPs of the fault condition. Normally, the periodicity of AIS packet transmission is fixed to 1 second. Upon receiving a packet with AIS information, a MEP detects an AIS defect condition and suppresses loss of continuity alarms associated with its peer MEP on the assumption that the source of the AIS messages has already alarmed the management system.

AIS may result, in turn, in the transmission of AIS packets to MPLS-TP client MEPs or it needs to be mapped into an equivalent AIS signal for whatever client layer is then being carried, for example into ETH AIS frames in case of Ethernet client MEPs.

The MPLS-TP OAM architecture augments the well understood AIS function with a Link Down Indication option for use when the CC/CV periodicity is comparatively low. When the Link Down Indication ("LDI") is set in a MEP, the AIS message containing LDI may be used to trigger recovery mechanisms. This is subsequently referred to as AIS-LDI indication.

RDI is an indicator that is transmitted by a MEP to communicate to its peer MEPs that a unidirectional signal fail condition exists. RDI is used for bidirectional connections and is associated with proactive CC and CV packet generation. In BFD, this is transmitted as a part of the BFD diagnostic field of the BFD messages being sent in the reverse direction by a MEP detecting failure. RDI is an indicator that is transmitted by a MEP to communicate to its peer MEPs that a signal fail condition exists. RDI enables an End Point to report, to its associated End Point, a fault or defect condition that it detects on a PW, LSP, or Section. What this ensures is that even in a uni-directional failure, both MEPs are aware of the fault as the return path used for RDI indication may have survived the failure the MEP originating RDI detected. RDI is not normally propagated into client layers. Client MEPs will independently generate RDI in response to the insertion of AIS.

Service internetworking via OAM state machine internetworking means that IWF Sink MEP 303 OAM indications are inputs to the state machine for its peer IWF Source MEP 305. Each IWF Sink and Source MEP (BFD IWF Sink and Source MEPs and Y.1731 IWF Sink and Source MEPs) has its own protocol specific state machine defining its different operating states. The details of the state machines are detailed below. However, as an introductory example, if a CC/CV message is not received from Source MEP 301 indicating that the link is down, the IWF Sink MEP 303 will convert this down signal into a AIS indication to be received by the IWF Source MEP 305 which will then send an appropriate signal to the Sink MEP 307.

There are a number of defect conditions detected by Y.1731 or BFD that can be relayed across the IWF 309. These include loss of continuity ("LOC") conditions, mismerge conditions, unexpected MEP ("UnexpectedMEP") conditions, unexpected MEG levels ("UnexpectedMEGLevel"), unexpected period ("UnexpectedPeriod") conditions, signal fail ("SignalFail") conditions, AIS conditions, RDI conditions, and LCK conditions. In most embodiments below, these defect conditions are simplified to only AIS and RDI as detailed below. This simplification minimizes the likelihood of failure given it is a point of failure that does not fate share with the datapath. Domain specific problems (lock maintenance, misbranching defects, etc.) which would be difficult to communicate inter-domain are confined to the local domain (e.g., Y.1731 specific defect conditions are not relayed to the BFD domain which would not understand them). State machine internetworking permits the domains to be separately administered as compared to the alternative of protocol translation. Additionally, in most embodiments, for BFD to Y.1731 internetworking, it is desirable that the BFD domain should run in "independent mode" to align in operation with Y.1731.

Figure 4:
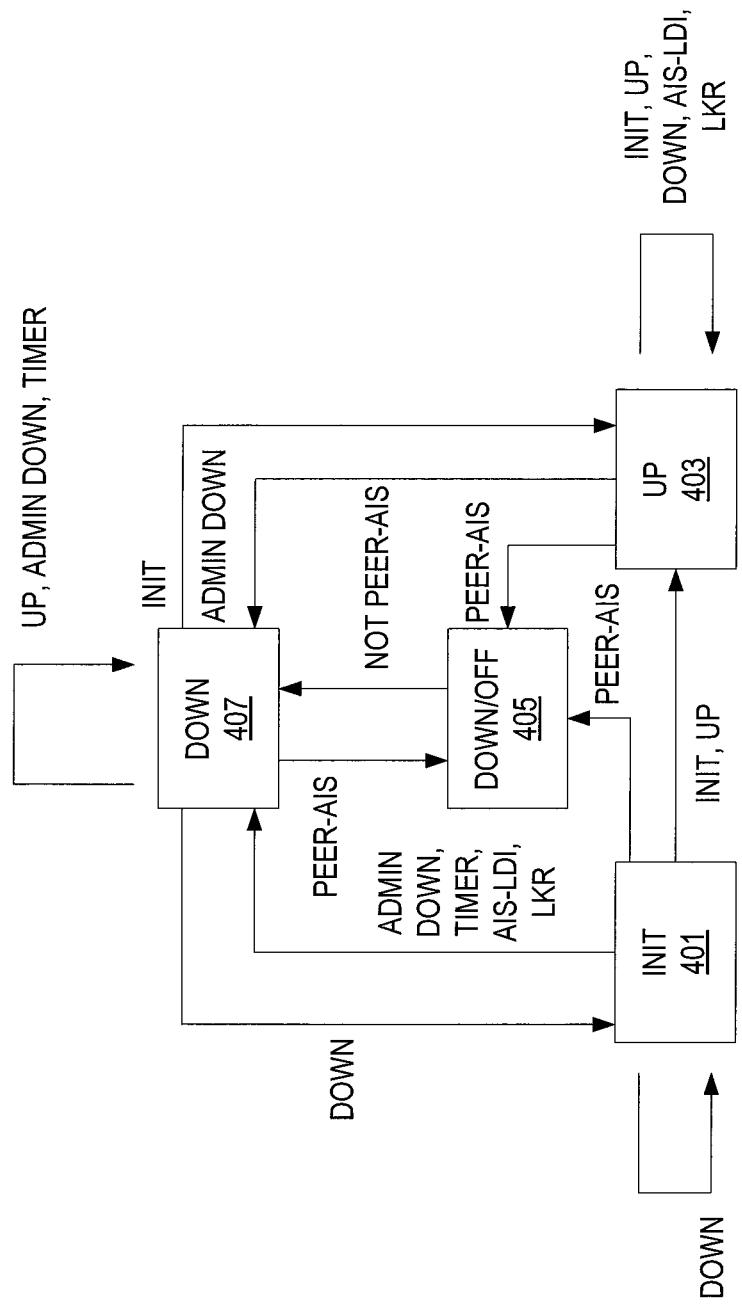
FIG. 4 illustrates an embodiment of a BFD state machine used in an IWF source MEP in BFD-Y.1731 IFW.

FIG. 4 illustrates an embodiment of a BFD state machine used in an IWF source MEP in BFD-Y.1731 IFW. In this embodiment, there are four session states through which a session normally proceeds: two for establishing a session (Init 401 and Up 403) and two for tearing down a session (Down 407 and Down/Off 405). This allows a four-way handshake for both session establishment and session teardown (assuring that both systems are aware of all session state changes). In the illustrated example, transitions between states are shown with arrowed lines. The text accompanying the arrowed lines typically represents received session state message or messages that have been sent from a BFD peer to the IWF source MEP ("Timer" is the expiration of a detection timer indicating a connection has been lost or may not come in as a new review message). In some embodiments, session state is communicated in the State ("Sta") field of a BFD control packet, and that received state, in combination with the local session state, drives the state machine.

In the Down state 407, the session is down (or has just been created). Semantically, Down state 407 indicates that the forwarding path is unavailable, and that appropriate actions should be taken by the applications monitoring the state of the BFD session. A system may hold a session in Down state 407 indefinitely (by simply refusing to advance the session state). This may be done for operational or administrative reasons. When in the Down state 407, the receipt of message indicating an Up state, "AdminDown," or expiration of a detection timer does not cause a state change. AdminDown means that the session is being held administratively down. This causes the remote system to enter Down state 407, and remain there until the local system exits the AdminDown state. AdminDown state has no semantic implications for the availability of the forwarding path. If a packet that signals Down state 407 is received, the session advances to the Init state 401. If that packet signals Init state instead, the session advances to the Up state 403. Finally, if a PEER-AIS indication is received, the IWF Source MEP will transition to the Down/Off state 405.

In the Init state 401, the remote system is communicating, and the local system desires to bring the session up, but the remote system does not yet realize this. A session will remain in Init state 401 until: i) a BFD control packet is received that signals Init or Up state 415 (in which case the session advances to the Up state 403); ii) a BFD Control Packet is received that signals AdminDown, AIS-LDI, Down, or LKR (in which case the session advances to the Down state 405); iii) a PEER-AIS indication is received; (in which case the session advances to the Down/Off state 409) or iv) a detection timer expires meaning that communication with the remote system has been lost (in which case the session advances to the Down state 407). The LDI flag is set in an AIS response to detecting a fatal failure in the server layer. The MPLS-TP Lock Report (LKR) message is generated when a server layer entity has been administratively locked and communicates that condition to inform the client layer entities In the Up state 403, the BFD session has successfully been established and connectivity between the systems should be working. The session will remain in the Up state 403 unless an AdminDown indication is received. The receipt of a message with Init, Up, Down, AIS-LDI, or Lkr will not change the state from Up 403.

Additionally, although not illustrated, in at least the Up 403 and Down/Off 405 states, the IWF source MEP will convert any diagnostic code indicating a Remote Defect Indication (RDI) (such as the BFD diagnostic field in BFD CC and CV messages) into a indication to the peer IWF sink MEP. Moreover, if an RDI is received by the IWF Source MEP in this state, it will stay in the Up state 403, but will relay the RDI message.

The final illustrated state is the Down/Off state 405. This state 405 is reached whenever the IWF source MEP receives an AIS from a peer. In this state 405, the MEP performs AIS generation if such a protocol data unit (PDU) type is supported. The source MEP will also stop BFD PDU generation. In other words, the only thing that the MEP will be doing is generating an AIS (typically at a rate of 1 every second although the timing may vary). In this state 405, all state machine transitions received will be ignored until the AIS indication is cleared and the IWF Source MEP is no longer receiving PEER-AIS (shown as "NOT PEER-AIS" in the figure).

Figure 5:
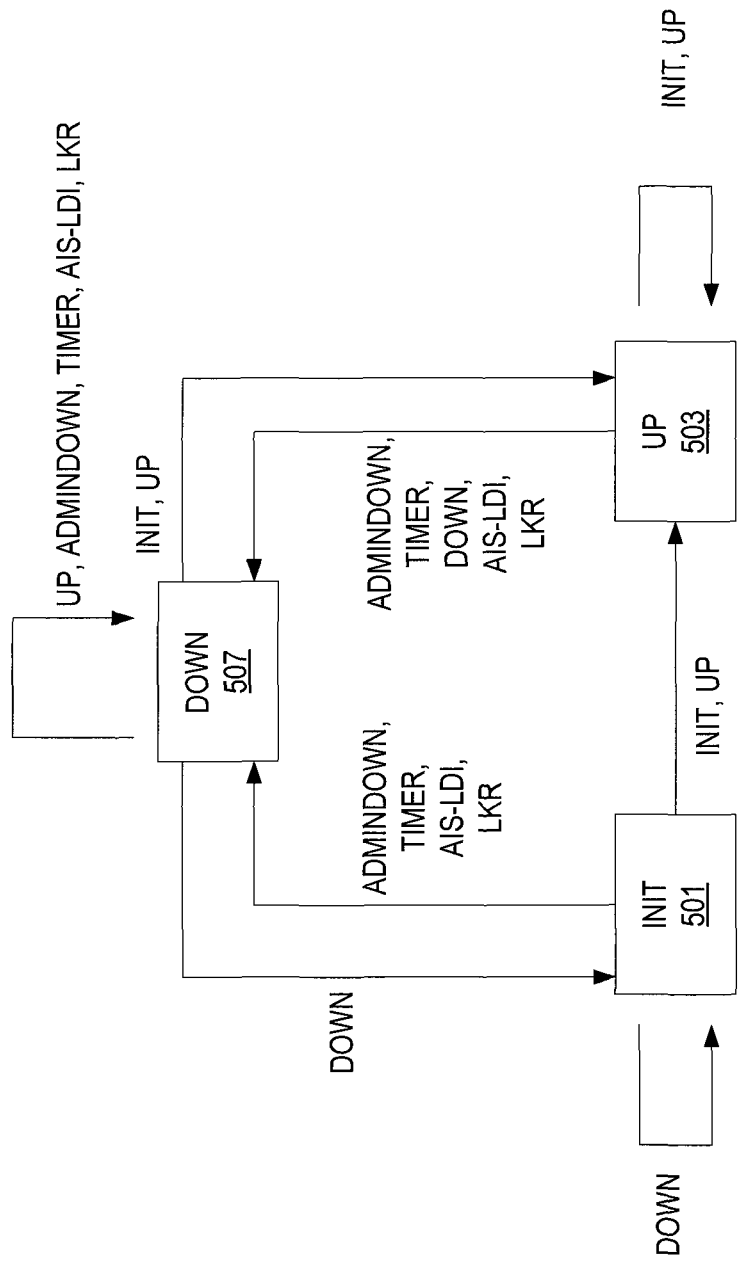
FIG. 5 illustrates an embodiment of a BFD state machine used in an IWF sink MEP in A BFD-Y.1731 IFW.

FIG. 5 illustrates an embodiment of a BFD state machine used in an IWF sink MEP in A BFD-Y.1731 IFW. In this embodiment, there are three session states through which a session normally proceeds: two for establishing a session (Init 501 and Up 503) and one for tearing down a session (Down 507). This allows a three-way handshake for both session establishment and session teardown (assuring that both systems are aware of all session state changes). In the illustrated example, transitions from between states are shown with arrowed lines. The text accompanying the arrowed lines typically represents received session state message or messages that have been received from another MEP. In some embodiments, session state is communicated in the State ("Sta") field of a BFD control packet, and that received state, in combination with the local session state, drives the state machine.

In the Down state 507, the session is down (or has just been created). Semantically, the Down state 507 indicates that the forwarding path is unavailable, and that appropriate actions should be taken by the applications monitoring the state of the BFD session. When in the Down state 507, the IWF Sink MEP will assert PEER-AIS or relay RDI indications for example, by asserting PEER-RDI. In other words, all fault indications with the exception of RDI are converted into AIS. When in the Down state 507, the receipt of message indicating AdminDown, AIS-LDI, or LKR, or the expiration of a detection timer does not change the state 507. If a packet that signals the Down state is received, the session advances to the Init state 501. If that packet signals the Init state or Up state, the session advances to the Up state 503.

In the Init state 501, the remote system is communicating, and the local system desires to bring the session up, but the remote system does not yet realize this. A session will remain in the Init state 501 until: i) a BFD Control Packet is received that signals the Init or Up state (in which case the session advances to the Up state 503); ii) a BFD Control Packet is received that signals AdminDown, AIS-LDI, Down, or LKR (in which case the session advances to the Down state 507); or iii) a detection timer expires meaning that communication with the remote system has been lost (in which case the session advances to the Down state of 507). Additionally, in some embodiments, until the Init state 501 has transitioned to the Up state 503, an AIS indication is transmitted across the IWF boundary.

In the Up state 503, the BFD session has successfully been established and connectivity between the systems should be working. The session will remain in the Up state 503 unless an AdminDown, AIS-LDI, Down, or Lkr indication is received. The receipt of Init or Up will not change the state. Additionally, although not illustrated, in some embodiments the IWF sink MEP will convert any diagnostic code indicating a RDI into a indication and relay the RDI in the Up state 503.

Figure 6:
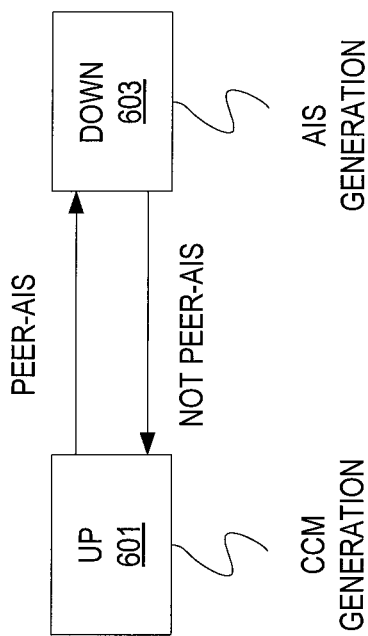
FIG. 6 illustrates an embodiment of a Y.1731 IWF Source MEP state machine running in independent mode.

FIG. 6 illustrates an embodiment of a Y.1731 IWF Source MEP state machine running in independent mode. In the Up state 601, the IWF Source MEP generates continuity check messages (CCM) to be transmitted to MEPs in its domain or to peer MEPs in the peer domain. Upon receiving a PEER-AIS signal, the state changes to the Down state 603. In the Down state, the Y.1731 IWF Source MEP generates AIS. When AIS has been deasserted ("NOT PEER-AIS") the state changes back to the Up state 601. RDI indications do not affect the state machine changes, but are simply relayed.

As detailed above, the BFD IWF Sink MEP converts all fault indications with the exception of RDI into a PEER-AIS indication to the peer (Y.1731) IWF Source MEP. The Y.1731 IWF Source MEP upon receipt of an PEER-AIS indication from the BFD IWF Sink MEP will initiate AIS generation (go to the Down state 603), cease CC/CV PDU generation, and convert any received CC/CV indicating RDI into an PEER-RDI indication. The Y.1731 IWF Source MEP upon receipt of an RDI indication from the peer (BFD) IWF Sink MEP will assert the PEER-RDI indication in the Y.1731 CC/CV PDUs sent to the peer sink MEP.

The state machine at a Y.1731 IWF Sink MEP is unmodified—on receipt of AIS or any defect other than RDI, it asserts PEER-AIS and on receipt of RDI it asserts PEER-RDI.

Figure 7A:
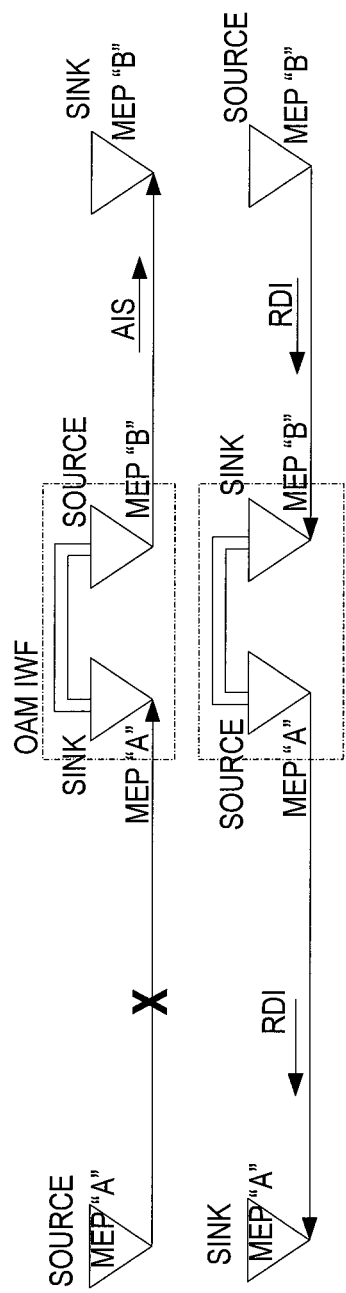
FIGS. 7(a)-(b) illustrate the generalized behavior using the above described state machines in a BFD-Y.1731 OAM IWF.
Figure 7B:
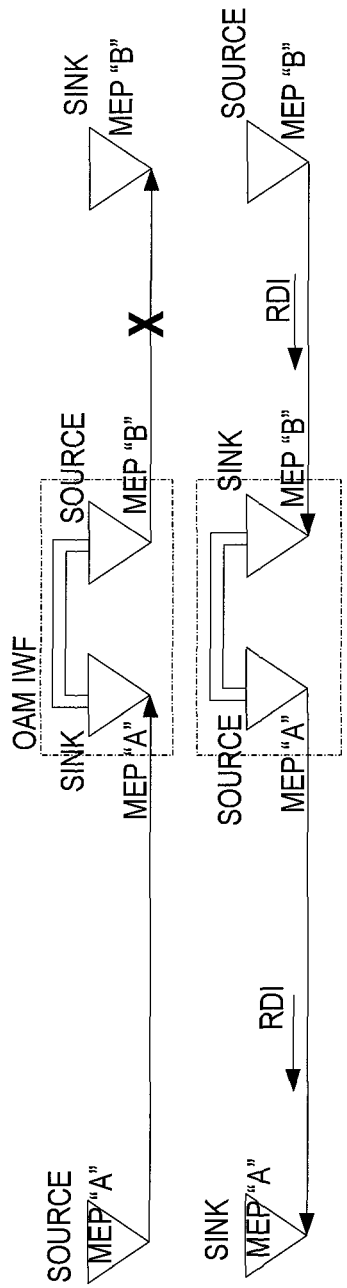

FIGS. 7(*a*)-(*b*) illustrate the generalized behavior using the above described state machines in a BFD-Y.1731 OAM IWF. The left half of these figures is domain "A" and the right is domain "B" (this "A" could be BFD and "B" Y.1731, or the opposite).

In FIG. 7(*a*), a defect has occurred between the source MEP in the A domain 701 and the IWF sink MEP in that domain 703. The IWF Sink MEP in the A domain 703 will pass a PEER-AIS indication to the IWF Source MEP in the B domain 705. For example, upon the detection of a failure (e.g., link down), a BFD IWF Sink MEP 703 will transition to the Down state 507 and indicate AIS to its peer Y.1731 Source MEP 705.

The receiving peer IWF Source MEP 705 in domain B will start generating periodic AIS messages to Sink MEP B 707. For example, if the IWF Source MEP in the B domain MEP 705 is a Y.1731 IWS Source MEP it will transition to the Down state 603 (it has received a PEER-AIS indication) and begin generating Y.1731 AIS indications. If the IWF Source MEP in the B domain 705 is a BFD IWS Source MEP it will transition to the Down/Off state 405 (it has received a PEER-AIS indication) and begin generating AIS indications.

The endpoint MEP 707 that receives this generated AIS indication, becomes a Source MEP in the B 709 domain and transmits an RDI back to the IWF MEP in its domain 711 (that MEP is a Sink MEP). This RDI indication is passed to the peer IWF Source MEP in the A domain 713 consistent with the state machine descriptions detailed above. The IWF Source MEP in domain A 713 will relay that RDI to its Sink MEP in the same domain 715.

In FIG. 7(*b*), a defect has occurred between the IWF Source MEP in the B domain 705 and its associated Sink Endpoint MEP in the same domain 707. The causes the endpoint MEP to act as a Source MEP 709 send back an RDI to the IWF Sink MEP 711 which then relays this RDI to the IWF Source MEP of the A domain 713. The IWF Source MEP of the A domain 713 then relays the RDI to the Sink endpoint MEP of domain A 715. This RDI alerts the endpoint MEP of domain A that there is a problem between the IWF MEP and endpoint MEP in domain B.

Figure 8:
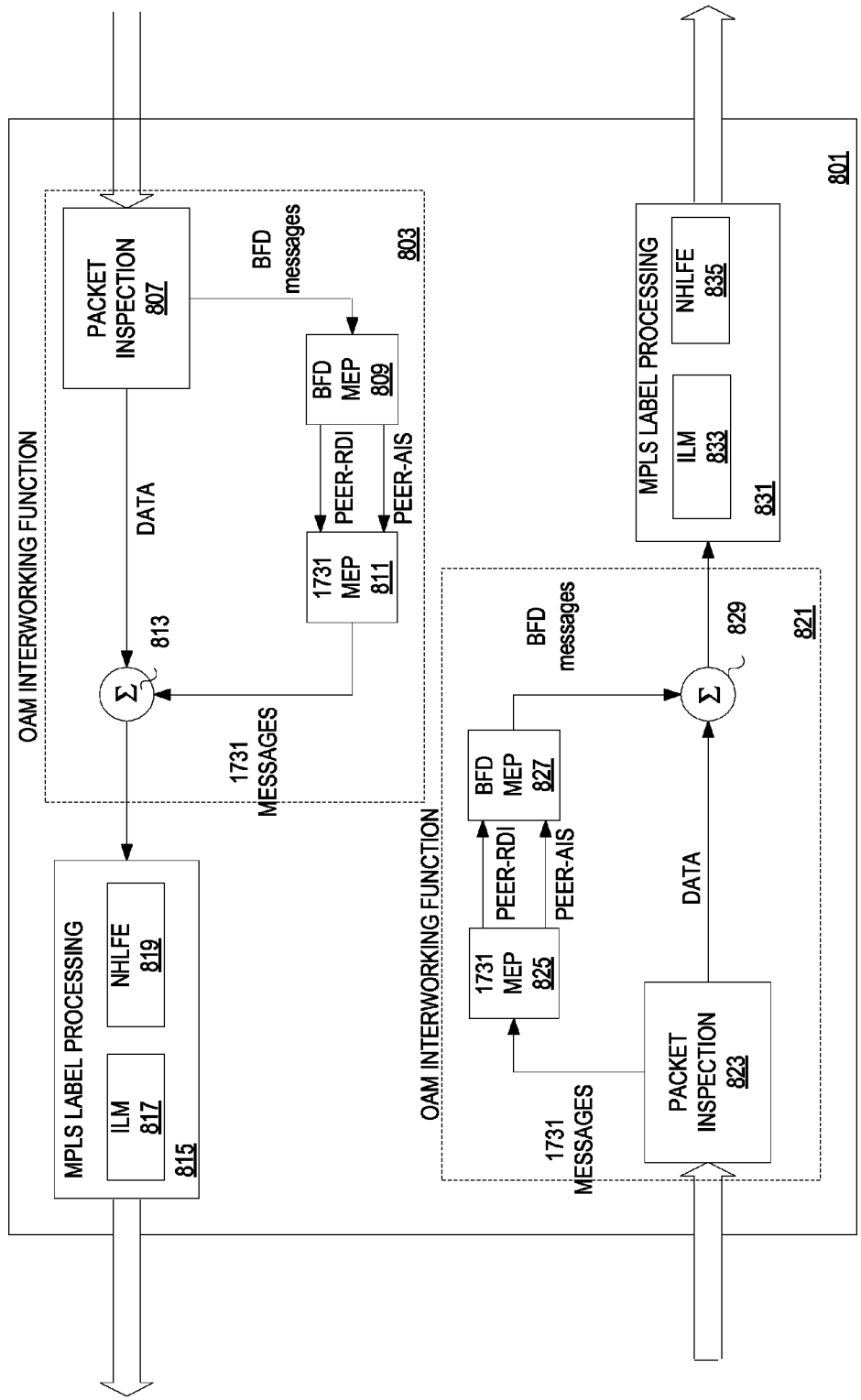
FIG. 8 illustrates an embodiment of a network element implementing OAM IWF.

FIG. 8 illustrates an embodiment of a network element implementing OAM IWF. In this embodiment, the network element 801 includes two OAM IWFs 803 and 821. IWF 803 includes a module for BFD packet inspection 807 which outputs data from the packet and BFD messages. The BFD messages are received by a IWF BFD MEP 809 such as those discussed above. The IWF BFD MEP 809 asserts PEER-RDI or PEER-AIS to a peer Y.1731 IWF MEP 811. This MEP 811 generates the appropriately formatted Y.1731 messages that are combined with the data from the packet at a combiner 813 to form a label. This label is processed by MPLS label processing components 815 of a FIB including a next hop label forwarding entry (NHLFE) 819 which contains next-hop information (interface and next-hop addresses) and label manipulation instructions, and an incoming label map (ILM) 815 which maps labels to corresponding NHLFEs.

IWF 821 includes a module for Y.1731 packet inspection 823 which outputs data from the packet and Y.1731 messages. The Y.1731 messages are received by a IWF Y.1731 MEP 825 such as those discussed above. The IWF Y.1731 MEP 825 asserts PEER-RDI or PEER-AIS to a peer BFD IWF MEP 827. This MEP 827 generates the appropriately formatted BFD messages that are combined with the data from the packet at a combiner 829 to form a label. This label is processed by MPLS label processing components 8331 of a FIB including a next hop label forwarding entry (NHLFE) 835 which contains next-hop information (interface and next-hop addresses) and label manipulation instructions, and an incoming label map (ILM) 833 which maps labels to corresponding NHLFEs.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method of processing defect conditions in a maintenance endpoint (MEP) of a first domain, the MEP a component of a bidirectional forwarding detection (BFD) to Y.1731 interworking interface (IWF) in a multi-protocol label switching (MPLS) network, the method comprising:
receiving a peer alarm indication signal (AIS) at an IWF MEP of a BFD domain of the MPLS network from an IWF MEP in a second domain of the MPLS network, wherein the IWF MEP of the BFD domain operates according to a state machine;
in response to receiving the peer AIS from the IWF MEP of the second domain of the MPLS network, the IWF MEP of the BFD domain of the MPLS network
transitioning the state machine to a down/off state;
halting BFD protocol data unit generation,
periodically providing an AIS indication in a format appropriate for the BFD domain to a remote MEP in the BFD domain of the MPLS network; and
ignoring other messages received at the IWF MEP of the BFD domain until it is no longer receiving a peer AIS from the IWF MEP of the second domain; and
wherein other states of the state machine include,
an init state wherein a remote MEP in the BFD domain is communicating with the BFD IWF MEP but a session has not yet been established between the remote MEP in the BFD domain and the BFD IWF MEP;
an up state wherein a BFD session has successfully been established between the remote MEP in the BFD domain and the BFD IWF MEP;
a down state wherein a BFD session between the remote MEP in the BFD domain and the BFD IWF MEP is down and a forwarding path from the BFD IWF MEP is unavailable.

2. The method of claim 1, wherein the second domain is Y.1371.

3. A system for processing defect conditions in a maintenance endpoint (MEP) of a first domain, the MEP a component of a bidirectional forwarding detection (BFD) to Y.1731 interworking interface (IWF) in a multi-protocol label switching (MPLS) network, the system comprising:
a BFD IWF MEP in a BFD domain for receiving and transmitting messages and indications from a Y.1731 IWF MEP in a Y.1731 domain, wherein the BFD IWF MEP is to operate according to a state machine, wherein in
an init state a remote MEP in the BFD domain is communicating with the BFD IWF MEP but a session has not yet been established between the remote MEP in the BFD domain and the BFD IWF MEP,
an up state a BFD session has successfully been established between the remote MEP in the BFD domain and the BFD IWF MEP,
a down state wherein a BFD session between the remote MEP in the BFD domain and the BFD IWF MEP is down and a forwarding path from the BFD IWF MEP is unavailable, and
a down/off state the BFD IWF MEP halts BFD protocol data unit generation, periodically provides an alarm indication signal (AIS) in a format appropriate for the BFD domain to the remote MEP in the BFD domain of the MPLS network, and ignores other messages received at the BFD IWF MEP until it is no longer receiving a peer AIS from the Y.1731 IWF MEP; and
the Y.1731 IWF MEP, the Y.1731 IWF MEP to operate according to a state machine, wherein in
an up state the Y.1731 IWF MEP generates continuity check messages, and
a down state halts the generation of continuity check messages and generates AIS in a format appropriate for the Y.1731 domain.

4. The system of claim 3, wherein the state of the BFD IWF MEP transitions from the down state to the init state upon receiving a down session state communication in a state field of a BFD control packet.

5. The system of claim 4, wherein the state of the BFD IWF MEP transitions from the down state to the up state upon receiving an init state communication in a state field of a BFD control packet.

6. The system of claim 4, wherein the state of the BFD IWF MEP transitions from the init state to the down state upon receiving one of an admin down session state indicating that the session is being held administratively down, an AIS-Link Down Indication (LDI), or a locker (LKR) indication in a state field of a BFD control packet.

7. The system of claim 4, wherein the state of the BFD IWF MEP transitions from the init state to the up state upon receiving one of an init session state or up session state in a state field of a BFD control packet.

* * * * *